(12) United States Patent
Sommer et al.

(10) Patent No.: US 7,699,931 B2
(45) Date of Patent: Apr. 20, 2010

(54) SOLIDIFICATION AND HARDENING ACCELERATOR FOR HYDRAULIC BINDING AGENTS AND METHOD FOR THE PRODUCTION THEREOF

(75) Inventors: Marcel Sommer, Pfungen (CH); Urs Mader, Frauenfeld (CH); Franz Wombacher, Oberlunkhofen (CH); Benedikt Lindlar, Constance (DE)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 12/003,448

(22) Filed: Dec. 26, 2007

(65) Prior Publication Data

US 2008/0110375 A1 May 15, 2008

Related U.S. Application Data

(63) Continuation of application No. 10/532,791, filed as application No. PCT/EP03/012579 on Nov. 11, 2003, now abandoned.

(30) Foreign Application Priority Data

Nov. 19, 2002 (EP) ................... 02025871

(51) Int. Cl.
*C04B 22/14* (2006.01)
*C04B 22/08* (2006.01)
*C04B 28/02* (2006.01)
*C04B 40/00* (2006.01)
*C04B 103/10* (2006.01)
*C04B 103/12* (2006.01)
*C04B 103/14* (2006.01)

(52) U.S. Cl. ................ 106/815; 106/717; 106/727; 106/728; 106/802; 106/808; 106/819; 106/823

(58) Field of Classification Search ............... 106/717, 106/727, 728, 808, 810, 815, 823, 802, 819
See application file for complete search history.

(56) References Cited

U.S. PATENT DOCUMENTS

| 5,968,256 | A | 10/1999 | Leikauf |
| 6,302,954 | B1 | 10/2001 | Lunkenheimer et al. |
| 6,692,564 | B2 | 2/2004 | Hofmann |
| 6,723,163 | B1 | 4/2004 | Hofmann |
| 7,037,369 | B2 * | 5/2006 | Angelskaar ............ 106/823 |
| 2002/0023574 | A1 | 2/2002 | Sommer et al. |

FOREIGN PATENT DOCUMENTS

| EP | 0 076 927 B1 | 4/1983 |
| EP | 0 946 451 B1 | 10/1999 |
| EP | 1 167 315 A1 | 1/2002 |
| FR | 2 800 062 | 4/2001 |
| JP | A 01-061339 | 3/1989 |
| WO | WO 96/05150 A1 | 2/1996 |
| WO | WO 00/78688 A1 | 12/2000 |
| WO | WO 01/42165 A2 | 6/2001 |
| WO | WO 03/029163 A2 | 4/2003 |

* cited by examiner

*Primary Examiner*—Anthony J Green
(74) *Attorney, Agent, or Firm*—Oliff & Berridge, PLC

(57) ABSTRACT

A setting and curing accelerator for hydraulic binders comprises: $Al_2(SO_4)_3$ aluminum sulfate, $Al(OH)_3$ aluminum hydroxide and mineral acid in aqueous solution.

The setting and curing accelerator preferably comprises:
10-50% of $Al_2(SO_4)_3$ aluminum sulfate,
5-30% of $Al(OH)_3$ aluminum hydroxide,
0.5-10% of a mineral acid
in aqueous solution.

16 Claims, No Drawings

SOLIDIFICATION AND HARDENING ACCELERATOR FOR HYDRAULIC BINDING AGENTS AND METHOD FOR THE PRODUCTION THEREOF

This is a Continuation of application Ser. No. 10/532,791 filed Jun. 14, 2006, now abandoned and is in turn is a National Phase of International Application No. PCT/EP2003/012579 filed Nov. 11, 2003. The disclosure of the prior applications is hereby incorporated by reference herein in its entirety.

TECHNICAL FIELD

The invention relates to a setting and curing accelerator for hydraulic binders according to the preamble of the first claim.

The invention likewise relates to a process for producing a setting and curing accelerator for hydraulic binders according to the preamble of the independent process claim.

PRIOR ART

Many substances which accelerate the setting and curing of concrete are known. Customary substances are, for example, strongly alkaline substances such as alkali metal hydroxides, alkali metal carbonates, alkali metal silicates, alkali metal aluminates and alkaline earth metal chlorides. However, the strongly alkaline substances have undesirable effects on the processor, e.g. burns, and they reduce the final strength and durability of the concrete.

EP 0 076 927 B1 discloses alkali-free setting accelerators for hydraulic binders which are said to avoid these disadvantages. To accelerate the setting and curing of a hydraulic binder such as cement, lime, hydraulic lime and plaster of Paris and mortar and concrete produced therefrom, from 0.5 to 10% by weight, based on the weight of this binder, of an alkali-free setting and curing accelerator comprising aluminum hydroxide is added to the mixture comprising the binder mentioned.

Such mortars and concretes are particularly well-suited as spray mortar and concrete as a result of the accelerated setting and curing.

EP 0 946 451 B1 discloses setting and curing accelerators in dissolved form for hydraulic binders, which can be more easily mixed into the concrete when spraying the concrete. Such a setting and curing accelerator comprises, inter alia, aluminum hydroxide, aluminum salts and organic carboxylic acids. However, a disadvantage of such setting and curing accelerators is the stability of the solution.

SUMMARY OF THE INVENTION

It is an object of the invention to achieve a very high accelerating action combined with a very long life of the accelerator for a setting and curing accelerator for hydraulic binders of the type mentioned at the outset.

According to the invention, this is achieved by the features of the first claim.

The advantages of the invention are, inter alia, that a high stability, i.e. stabilization of the accelerator solution, is achieved by means of the accelerators of the invention and that high acceleration of the setting and curing of hydraulic binders is achieved.

Hydraulic binders with addition of the accelerator of the invention can be processed advantageously by spraying because of their accelerated setting and curing behavior.

Further advantageous embodiments of the invention are disclosed in the subordinate claims.

WAY OF CARRYING OUT THE INVENTION

A setting and curing accelerator according to the invention for hydraulic binders comprises: $Al_2(SO_4)_3$ aluminum sulfate, $Al(OH)_3$ aluminum hydroxide and mineral acid in aqueous solution.

Such a setting and curing accelerator according to the invention advantageously consists essentially of (in % by weight):
  10-50% of $Al_2(SO_4)_3$ aluminum sulfate,
  5-30% of $Al(OH)_3$ aluminum hydroxide,
  0.5-10% of mineral acid,
  0-10% of alkanolamine,
  0-5.0% of fluidizer,
  0-20% of stabilizer, in aqueous solution.

As mineral acid, preference is given to using phosphoric or boric acid, but it is also possible to use other mineral acids having a similar action, e.g. nitric acid, sulfuric acid, etc. Diethanolamine is advantageously used as alkanolamine. Polycarboxylates, particularly advantageously Sika ViscoCrete®, in particular Sika ViscoCrete® 20HE are advantageously used as fluidizers. Silica sol is advantageously used as stabilizer.

Particularly advantageous setting and curing accelerators consist essentially of (in % by weight):
  30-50% of $Al_2(SO_4)_3$ aluminum sulfate, in particular 40-45%, and/or
  5-20% of $Al(OH)_3$ aluminum hydroxide, in particular 10-17%, and/or
  0.5-8% of mineral acid and/or
  0-5% of alkanolamine and/or
  0.1-3.0% of fluidizer, in particular from 0.1 to 1.0%, and/or
  0-10% of stabilizer.

It is also advantageous to add the mineral acid fraction of 0.5-10% as $H_3PO_4$ phosphoric acid and/or $H_3BO_3$ boric acid. Particularly advantageous ranges are 1-5% of $H_3PO_4$ phosphoric acid and/or 0.5-3.0% of $H_3BO_3$ boric acid.

A number of samples of an accelerator according to the invention were produced in the above-described ranges. The composition of these samples is indicated in the following examples.

EXAMPLE 1

7.60 kg of aluminum hydroxide $Al(OH)_3$ are added to a solution of 22.50 kg of aluminum sulfate with water of crystallization $Al_2(SO_4)_3 \times 14H_2O$ in 17.06 kg of water $H_2O$ at 70-80° C. 1.14 kg of a phosphoric acid solution $H_3PO_4$ (75%), 2 kg of a silica sol (10% solids content) and 1.70 kg of a corrosion inhibitor, viz. a 90% solution of diethanolamine, are subsequently added to the resulting solution and this mixture is stirred for half an hour.

The stability of this mixture was at least 70 days.

EXAMPLE 2

7.60 kg of aluminum hydroxide $Al(OH)_3$ are added to a solution of 22.50 kg of aluminum sulfate with water of crystallization $Al_2(SO_4)_3 \times 14H_2O$ in 14.86 kg of water $H_2O$ at 70-80° C. 2.84 kg of a phosphoric acid solution $H_3PO_4$ (75%), 0.50 kg of polycarboxylates, e.g. Sika ViscoCrete® 20HE which is a high-performance fluidizer, and 1.70 kg of a corrosion inhibitor, viz. a 90% solution of diethanolamine, are subsequently added to the solution obtained and this mixture is stirred for half an hour.

The stability of this mixture was at least 70 days.

EXAMPLE 3

8.00 kg of aluminum hydroxide Al(OH)$_3$ are added to a solution of 22.50 kg of aluminum sulfate with water of crystallization Al$_2$(SO$_4$)$_3$×14H$_2$O in 16.56 kg of water H$_2$O at 70-80° C. 1.14 kg of a phosphoric acid solution H$_3$PO$_4$ (75%), 0.10 kg of boric acid H$_3$BO$_3$ and 1.70 kg of a corrosion inhibitor, viz. a 90% solution of diethanolamine, are subsequently added to the solution obtained and this mixture is stirred for half an hour. The stability of this mixture was at least 70 days.

EXAMPLE 4

8.10 kg of aluminum hydroxide Al(OH)$_3$ are added to a solution of 20.60 kg of aluminum sulfate with water of crystallization Al$_2$(SO$_4$)$_3$×14H$_2$O in 21.00 kg of water H$_2$O at 70-80° C. 0.30 kg of boric acid H$_3$BO$_3$ is subsequently added to the resulting solution and this mixture is stirred for half an hour.

The stability of this mixture was at least 70 days.

EXAMPLE 5

8.00 kg of aluminum hydroxide Al(OH)$_3$ are added to a solution of 21.00 kg of aluminum sulfate with water of crystallization Al$_2$(SO$_4$)$_3$×14H$_2$O in 20.00 kg of water H$_2$O at 70-80° C. 1.00 kg of boric acid H$_3$BO$_3$ and 0.50 kg of polycarboxylates, e.g. Sika ViscoCrete® 20HE which is a high-performance fluidizer, are subsequently added to the solution obtained and this mixture is stirred for half an hour.

The stability of this mixture was at least 70 days.

From 0.1 to 10% by weight of the accelerator of the invention can be added to the hydraulic binder.

To determine the effectiveness of the accelerator of the invention from Examples 1 to 5, 6% of the accelerator from the above examples was in each case mixed into portland cement and penetrometer values were determined. The following table shows the penetrometer values together with the time required in each case to reach strengths of 200 g, 600 g and 2200 g. These penetrometer values were determined using a needle having a diameter of 3 mm and a test apparatus from RMU.

A sample of portland cement without accelerator was used as comparison and the penetrometer values for the same sample composition when the accelerator was left out without replacement and when the accelerator was replaced by a corresponding amount of water were determined.

| Penetrometer value for | 200 g | 600 g | 2200 g |
|---|---|---|---|
| Example 1 | 5 min | 7 min | 15 min |
| Example 2 | 6 min | 8 min | 16 min |
| Example 3 | 6 min | 9 min | 20 min |
| Example 4 | 7 min | 14 min | 40 min |
| Example 5 | 12 min | 20 min | 55 min |
| Sample without accelerator | 450 min | 485 min | 540 min |
| Sample without accelerator but with equivalent amount of water | 490 min | 522 min | 579 min |

The accelerators prepared as described in Examples 1 to 5 thus gave solutions which display satisfactory acceleration values and remain stable for a sufficiently long time.

The accelerators of the invention can also be used for hydraulic binders other than cement, e.g. blended cements, lime, hydraulic lime and plaster of Paris and also mortar and concrete produced therefrom. Of course, the invention is not restricted to the example presented and described. The accelerators present in aqueous solution can also be used in dried form, e.g. after drying by means of a generally known spray drying process. The dried powder obtained in this way, which is readily soluble in water, is dissolved in water before use and then used in the same way as the liquid accelerator. The samples prepared as described in Examples 1 to 5 can also be produced in a temperature range from room temperature RT to 90° C., but preferably in a range from 50 to 80° C.

The invention claimed is:

1. A setting and curing accelerator for hydraulic binders, comprising:
    Al$_2$(SO$_4$)$_3$ aluminum sulfate;
    Al(OH)$_3$ aluminum hydroxide; and
    mineral acid in aqueous solution, wherein
    the mineral acid consists of (in % by weight of the setting and curing accelerator) 1-5% of H$_3$PO$_4$ phosphoric acid and/or 0.5-3.0% of H$_3$BO$_4$ boric acid, and
    the mineral acid is the only acid present in the setting and curing accelerator.

2. The setting and curing accelerator as claimed in claim 1, wherein (in % by weight) a proportion of aluminum sulfate is 10-50% and/or a proportion of aluminum hydroxide is 5-30%.

3. The setting and curing accelerator as claimed in claim 1, wherein (in % by weight) a proportion of aluminum sulfate is 30-50% and/or a proportion of aluminum hydroxide is 5-20%.

4. The setting and curing accelerator as claimed in claim 1, wherein (in % by weight) a proportion of aluminum sulfate is 40-45% and/or a proportion of aluminum hydroxide is 10-17%.

5. The setting and curing accelerator as claimed in claim 1, wherein (in % by weight) 0-10% of alkanolamine and/or 0-5.0% of fluidizer and/or 0-20% of stabilizer are present.

6. The setting and curing accelerator as claimed in claim 1, wherein (in % by weight) 0-5% of alkanolamine and/or 0-10% of stabilizer and/or 0-3.0% of fluidizer are present.

7. The setting and curing accelerator as claimed in claim 5, wherein the alkanolamine is a diethanolamine.

8. The setting and curing accelerator as claimed in claim 5, wherein the stabilizer is a silica sol.

9. The setting and curing accelerator as claimed in claim 5, wherein the fluidizer is a polycarboxylate.

10. A process for producing a setting and curing accelerator, wherein a setting and curing accelerator as claimed in claim 1 which is present in aqueous solution is dried.

11. The process for producing a setting and curing accelerator as claimed in claim 10, wherein a dried mixture is obtained and is dissolved in water before addition to a hydraulic binder.

12. A process for producing the setting and curing accelerator as claimed in claim 10, wherein the setting and curing accelerator that is present in the aqueous solution is dried by a spray-drying process.

13. A process for producing a setting and curing accelerator as claimed in claim 1, wherein during production of the aqueous solution and addition of the components in the production of the solution, the solution is heated in a range from room temperature to 90° C.

14. The process for producing a setting and curing accelerator as claimed in claim 13, wherein the solution is heated to 50-80° C.

15. A method of accelerating the setting and curing of hydraulic binders and also mortar or concrete produced therefrom, wherein a setting and curing accelerator as claimed in claim 1 is added in an amount of from 0.1 to 10% by weight to a mixture comprising hydraulic binders, with the percentages by weight being based on the weight of the hydraulic binder.

16. A spray concrete or spray mortar comprising the setting and curing accelerator as claimed in claim 1.

* * * * *